US010797785B1

(12) United States Patent
Rhee (10) Patent No.: US 10,797,785 B1
(45) Date of Patent: Oct. 6, 2020

(54) REAL-TIME COMMUNICATION BETWEEN SATELLITES AND MOBILE DEVICES

(71) Applicant: DreamSpaceWorld Co., LTD., Daejeon (KR)

(72) Inventor: Sung Ho Rhee, Daejeon (KR)

(73) Assignee: DREAMSPACEWORLD CO., LTD., Daejeon (KR)

( * ) Notice: Subject to any disclaimer, the term of this patent is extended or adjusted under 35 U.S.C. 154(b) by 0 days.

(21) Appl. No.: 16/510,814

(22) Filed: Jul. 12, 2019

(51) Int. Cl.
*H04Q 3/64* (2006.01)
*H04B 7/185* (2006.01)
*H04L 12/24* (2006.01)
*H04W 76/14* (2018.01)

(52) U.S. Cl.
CPC ..... *H04B 7/18517* (2013.01); *H04B 7/18589* (2013.01); *H04L 41/22* (2013.01); *H04W 76/14* (2018.02)

(58) Field of Classification Search
CPC . H04L 65/1069; H04L 12/4633; H04L 12/66; H04L 1/0045; H04L 5/0007; H04L 5/14; H04W 76/10; H04W 88/02; H04W 8/005; H04W 76/14; H04B 7/0452; H04B 7/18513; H04B 7/18578

USPC ........................................................ 455/3.02
See application file for complete search history.

(56) References Cited

U.S. PATENT DOCUMENTS

2012/0069131 A1*  3/2012  Abelow .............. G06Q 10/067
                                                                      348/14.01
2019/0253952 A1*  8/2019  Kumar .................. H04W 76/27

* cited by examiner

*Primary Examiner* — Tu X Nguyen
(74) *Attorney, Agent, or Firm* — Patent Office of Dr. Chung Park (57) ABSTRACT

Systems and methods for accessing a satellite in real-time. A mobile device for accessing a satellite in real-time includes: a communication device for directly communicating data with a satellite; a display for displaying a graphic user interface (GUI); one or more processors; and a non-transitory computer-readable medium comprising one or more sequences of instructions which, when executed by the one or more processors, causes steps to be performed comprising: responsive to a touch on the GUI, sending data directly to the satellite via the communication device. The data sent to the satellite includes information of global positioning system (GPS) coordinates of the mobile device and an identification of a user of the mobile device, a set of access parameters, a query for a list of satellites that are accessible in real-time according to the set of access parameters.

17 Claims, 10 Drawing Sheets

REAL-TIME COMMUNICATION BETWEEN SATELLITES AND MOBILE DEVICES

A. TECHNICAL FIELD

The present invention relates to a wireless communication, more particularly, to systems and methods for direct communications between satellites and mobile devices in real-time.

B. DESCRIPTION OF THE RELATED ART

With advent of satellite technologies, it is now feasible to acquire data using satellites in various technical applications. In the conventional communication systems, the satellites communicate such data with ground stations: the ground stations transmit data to the satellites so as to control/access the satellites and receive data, from the satellites, that was gathered by the satellites during their missions. Thus, if a user of a mobile device wants to access data received from the satellites or control the satellites, the user has to connect to the ground station that can communicate with the satellites.

Such conventional systems have several difficulties. First, when the mobile device is located outside the region, such as desert or remote/secluded area, where the ground station cannot be reached, either wirelessly or by wire, the user cannot communicate with the satellites. Since the ground station has the exclusive direct access to satellites, the communication is possible only through the ground station. Second, the data sent from the satellites is sent to the ground station that subsequently processes the data before sending the processed data to the mobile device. As such, there may be a time delay between transmitting data by the satellites to the receiving the data by the mobile device. Such a time delay may make it impossible for the satellites to communicate with the mobile device in real-time, where the real-time communication may be an important feature in certain emergency situations, such as tsunami warning, typhoon's path prediction, information on volcanic activities, so on. As such, there is a need for systems and methods for direct communication between satellites and mobile devices in real-time.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in the drawings are illustrative of exemplary embodiments of the present invention and are meant to avoid obscuring the invention. Furthermore, connections between components within the figures are not intended to be limited to direct connections. Rather, data between these components may be modified, re-formatted, or otherwise changed by intermediary components or devices. Also, additional or fewer connections may be used. It shall also be noted that the terms "coupled" "connected" or "communicatively coupled" shall be understood to include direct connections, indirect connections through one or more intermediary devices, and wireless connections.

Furthermore, by applying relevant technology, one skilled in the art shall recognize: (1) that certain steps may optionally be performed; (2) that steps may not be limited to the specific order set forth herein; (3) that certain steps may be performed in different orders; and (4) certain steps may be done concurrently.

The present invention relates to a real-time communication between the satellites and mobile devices, more particularly, to systems and methods for direct communication between satellites in orbits and mobile devices in real-time. Hereinafter, the term mobile device(s) may refer to various types of electronic devices that allow the users to directly communicate with a satellite and exchange data with the satellite in real-time, and the electronic devices may include mobile phones, palm computers, Tablet PCs, notebook computers, desktop computers, AR (Augmented Reality) devices, VR (Virtual Reality) devices, smart wearables such as smart goggles, smart glasses and smart watches, remote controlling devices, etc.

Figure 1:
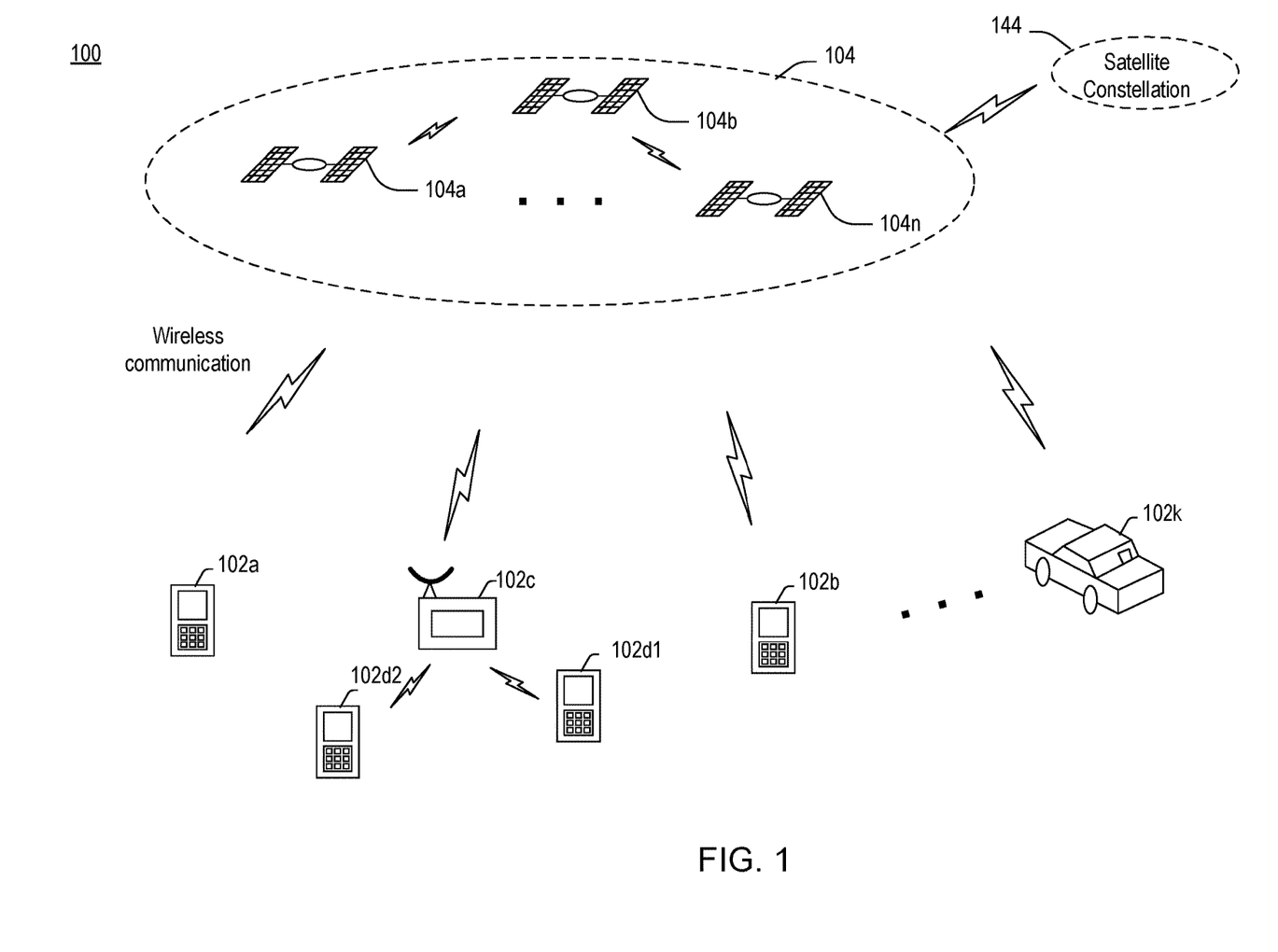
FIG. 1 ("FIG.") shows a schematic diagram of a system for direct communication between satellites and mobile devices according to embodiments of the present disclosure.

FIG. 1 shows a schematic diagram of a system 100 for direct communication between one or more satellites 104a-104n and mobile devices 102a-102k according to embodiments of the present disclosure. As depicted, the satellites 104a-104n may fly in formation and be directly and communicatively coupled to the mobile devices 102a-102k, establishing communication channels between the mobile devices 102a-102k and the satellites 104a-104n.

In embodiments, each of the satellites 104 may include payloads, where each payload may be determined by the mission for outer space, the supporting subsystems and components that make up the bus. In embodiments, the missions may include direct communications with the mobile devices 102a-102k, earth surface observation, weather tracking, maritime measurements and scientific research of celestial bodies, etc.

In embodiments, the missions may also include various scientific research on polar landscapes and icebergs, Earth surface and atmosphere, oceanic circulation, water/energy cycles, and monitoring the concentration of phytoplankton, suspended particulate matter and dissolved organic matter of a given area. In embodiments, payload camera (Optical, SAR (Synthetic Aperture Radar), IR (Infrared), etc.) may be used to analyze surface area landscapes and also directly identify and check in real-time a certain phenomenon taking place in a specific area.

In embodiments, the satellites 104 may include the LEO (Low Earth Orbiting) satellites that orbit relative to the Earth so that they look like they are moving when looked upon from the Earth. In embodiments, the satellites 104 may also include the geosynchronous satellites which orbit the Earth at the same rate as the Earth's rotation (i.e. orbital period equivalent to the Earth's rotation period) so that when looked upon from the Earth, seem like they are staying at the same spots. In embodiments, the satellites 104 may communicate and share data with each other, i.e., perform inter-satellite communication, to form a satellite network.

By way of example, the mobile device 102a (or 102b) may directly communicate date with the satellite 104a (or 104b) in real-time, where the data may include one or more of text message, voice message, image/picture in JPEG format, video clip in MPEG format, telemetry data (described in conjunction with FIGS. 8 and 9), etc. As such, the satellites 104 may enable the two users of the mobile devices 102a and 102b to have phone conversation with each other in real-time. It is noted that, unlike the conventional communications system, any ground station or base station is not needed for the communication between the two mobile devices 102a and 102b in the system 100. (Hereinafter, the term ground station refers to a station that has either fixed or itinerant position on the Earth.) Thus, in embodiments, a phone conversation between the two mobile devices may be possible even if the mobile device (e.g. 102b) may be located in a region, such as desert or remote/secluded area, such that the mobile device 102b cannot reach any ground station or any base station that provides wireless communication services to mobile devices.

In embodiments, each of the satellites 104 may be of various sizes, such as microsat, nanosat and cubesat. Also, the number and locations of satellites 104 may be determined to cover the entire surface area of the Earth, i.e., one mobile device (e.g. 102a) may be able to communicate with other mobile device (e.g. 102k) that is located anywhere on the Earth. By way of example, a signal transmitted from the mobile device 102a may be delivered to another mobile device 102k via the communication channel: mobile device 102a→satellite 104a→satellite 104n→mobile device 102k.

In embodiments, a mobile device (e.g. 102c) may include a mobile relay antenna, where the mobile device 102c may communicate with a satellite (e.g. 104b) and be communicatively coupled to another mobile devices (such as mobile phones) 102d1 and 102d2 either wirelessly or by wire. In FIG. 1, only two mobile devices 102d1 and 102d2 are shown to communicate with the satellite 104b via the mobile device 102c. However, it should be apparent to those of ordinary skill in the art that the mobile device 102c may be used to provide communication services to other suitable number of mobile devices. In embodiments, the mobile devices 102d1 and 102d2 may not be able to transmit the signals directly to the satellites 104 due to the limited output power level. As such, using the mobile relay antenna, the mobile device 102c may transmit a signal at a higher power to thereby transmit the signal further away than the mobile devices 102d1 and 102d2. Similarly, the mobile relay antenna may have a larger footprint, which is an area for receiving the signal from the satellite, than the mobile devices 102d1 and 102d2 to thereby increase the intensity of the signal received from the satellites.

In embodiments, the user of a mobile device (e.g. 102a) may have direct access to the data stored in the satellite and/or may control one or more satellites to perform one or more outer space missions. In embodiments, the mobile device 102a may send data to a satellite (e.g. 104a) so as to control a satellite (e.g. 104b), where the data may include one or more of control parameters, such as (but not limited to) user ID and password, target satellite, satellite identifying information, angle range for coverage area determination, control objective, observation time window, etc. The satellite 104a may validate the user ID in the data from the mobile device 102a and, upon successful authentication of the user ID, the satellite 104a may grant access rights to the mobile device 102a. In embodiments, once access is allocated to the mobile device 102a through the due approval process, the user of the mobile device 102a may start controlling the satellite 104b in real-time within the given angle and time frame allocated during the approval process. In embodiments, the angle refers to the view angle to cover the area of interest.

In embodiments, the authentication process described above may be performed by the satellite 104b instead of the satellite 104a. The satellite 104a may relay the control data received from the mobile device 102a to the satellite 104b by the inter-satellite communication, and the satellite 104b may validate the user ID and send a signal for granting an access right to the mobile device 102a via the satellite 102a. By way of example, the mobile device 102a may control the satellite 104b to acquire an image of tsunami on a specific location on the Earth at a specific point in time.

In embodiments, the satellites 104 may communicate data with other satellite constellation 144, where the satellite constellation may include a number of satellites operating together under shared control and synchronized so as to overlap in coverage. In embodiments, the satellites 104 may access and/or control one or more the satellites in the satellite constellation 144, i.e., each f the satellites 104 may act as a gateway to the satellite constellation 144.

Figure 2:
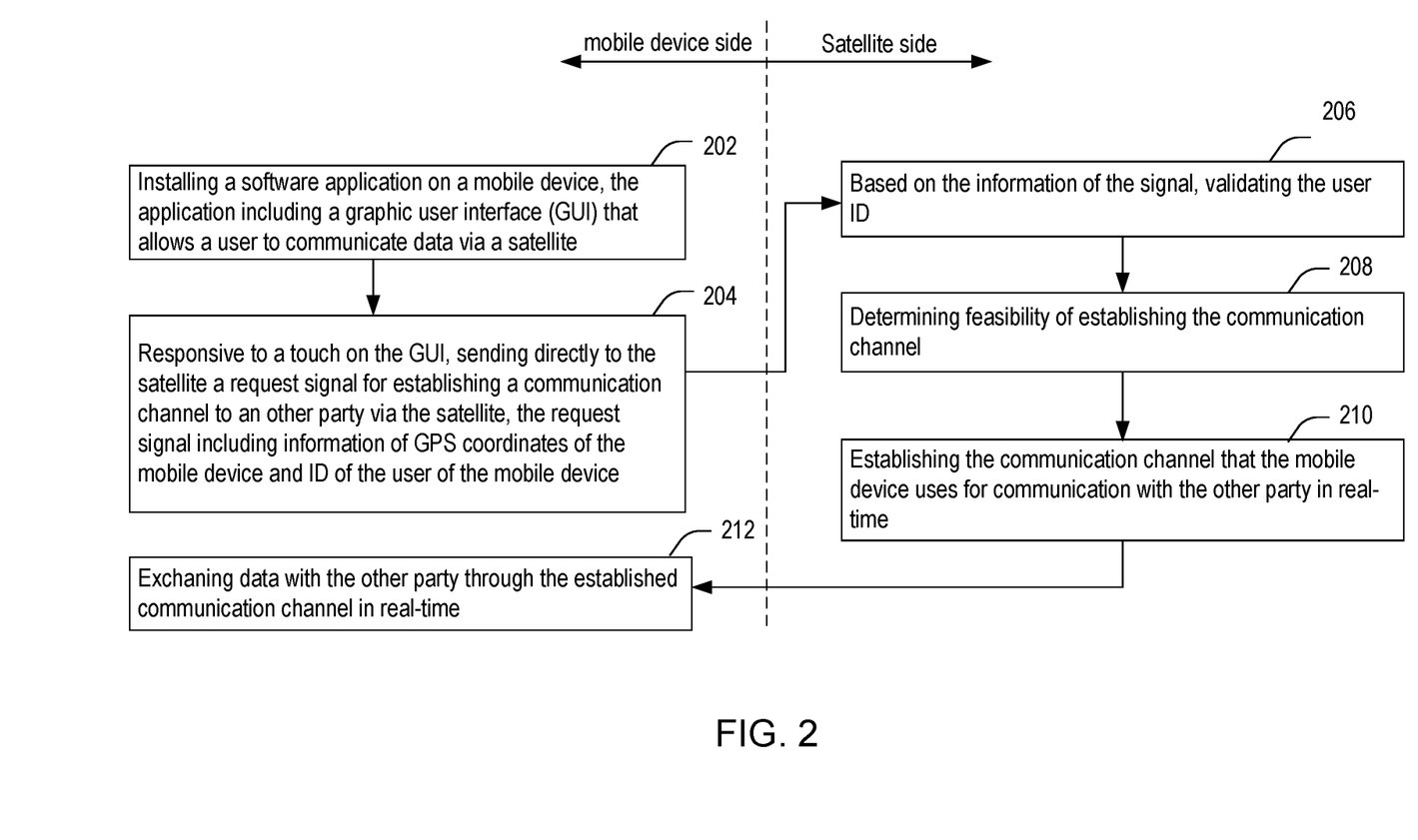
FIG. 2 shows a flowchart of an illustrative process for direct communication between a mobile device and a party on the ground via a satellite in real-time according to embodiments of the present disclosure.
Figure 3:
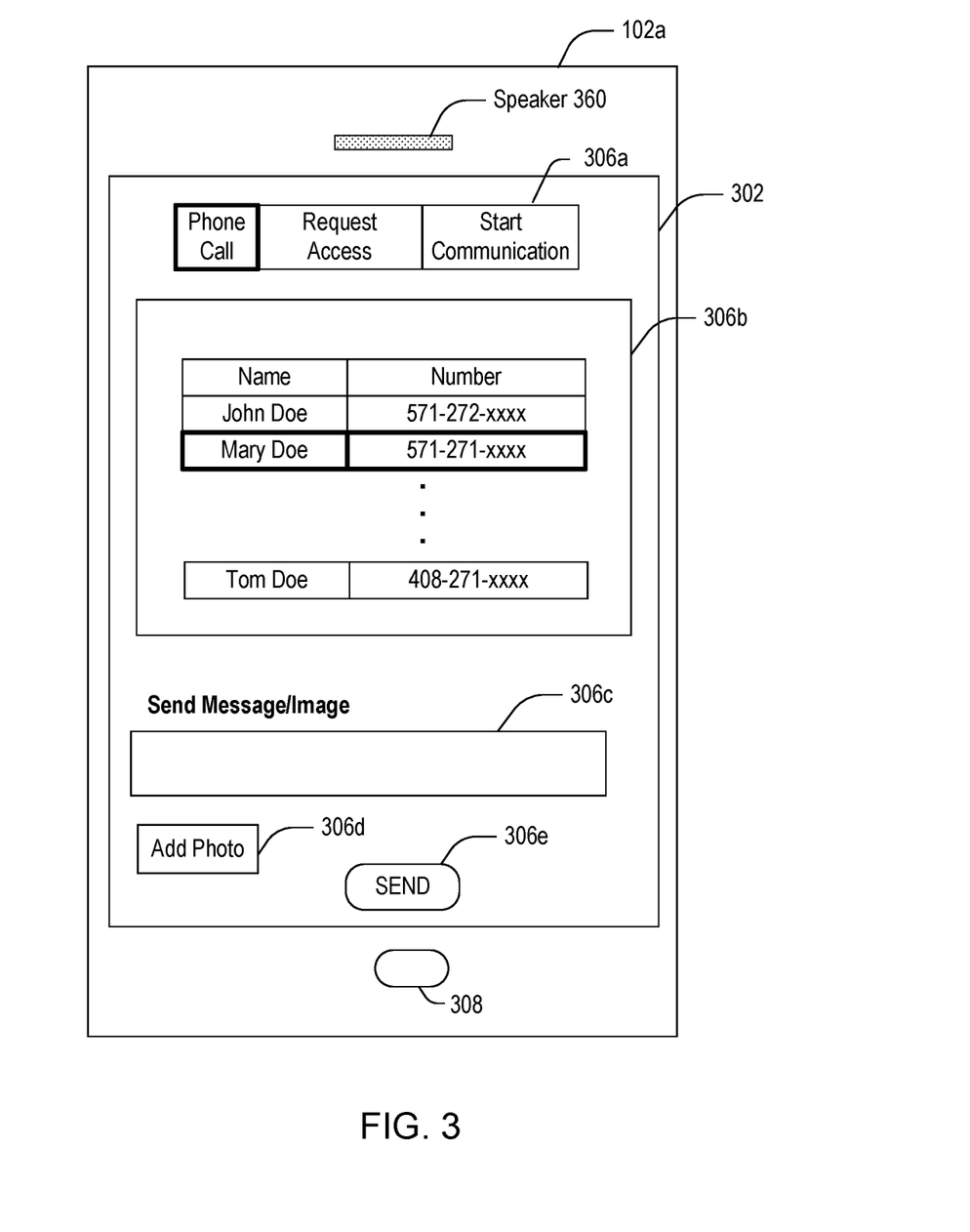
FIG. 3 shows a mobile phone according to embodiments of the present disclosure.

FIG. 2 shows a flowchart of an illustrative process for direct communication between a mobile device and a party on the ground via a satellite in real-time according to embodiments of the present disclosure. The process may start at step 202. At step 202, the user of the mobile device (e.g. 102a) may install a software application on the mobile device 102a, where the application includes a graphic user interface (GUI) that allows a user to communicate data with a satellite (e.g. 104a). FIG. 3 shows the mobile phone 102a according to embodiments of the present disclosure. As depicted, the mobile phone 102a may include: a speaker 360; a button 308; and a display 302 for displaying the GUI components 306a-306e. The user of the mobile device 102a may push the button 308 to select various functions of the mobile device 102a. It is noted that the mobile device 102a may have other suitable design and components, such as camera, microphone, etc. Also, the GUI 306 may have other suitable design and arrangements of GUI components.

In embodiments, the user may touch the "Phone Call" button in the menu 306a of the GUI. Then, the mobile device 102a may display a phone list 306b that are already stored in the mobile device, allowing the user select one phone number, such as "Mary Doe," among the phone list. Alternatively, the user may want to send a text message, an image/picture, or a video clip. In such a case, the user may enter a text message into the data field 306c and/attach an image/picture in JPEG format or video clip in MPEG format using the button 306d. Then, the user may touch the "SEND" button 306e.

In response to the user's touch of the "SEND" button, at step 204, the mobile device 102a may send, directly to the satellite 104a, a request signal for establishing a communication channel to another party. It is noted that the another party may not be necessarily a mobile device, even though the mobile device 102b is treated as the other party for the purpose of illustration. In embodiments, as discussed in conjunction with FIG. 8, the request signal may include information of the global positioning system (GPS) coordinates of the mobile device 102a and identification (ID) of the user of the mobile device. It is noted that each of the mobile devices 102 may be able to determine the GPS coordinates of its own location. At step 206, the satellite 104a may validate the user ID using the signal from the mobile device 102a.

Upon successful authentication of the user ID, the satellite 104a may assess the feasibility of establishing the communication channel between the mobile devices 102a and 102b at step 208. In embodiments, the satellite 104a may use the information of other satellites' locations to determine the feasibility. For instance, each of the satellites 104 may be able to determine the current location of other satellite, say 104b. When the satellite 104a receives from the mobile device 102a a request to make a phone call to "Mary Doe" and the satellite 104b may be currently located to cover the area code "571," the satellite 104a may forward the request signal to the satellite 104b, querying whether a satellite 104b is able to establish the communication channel with the mobile phone 102b.

At step 210, the satellite may establish the communication channel that the user of the mobile device 102a may use for communication with the user of the mobile device 102b in real-time. Then, at step 212, the user of the mobile device 102a may chat and/or exchange messages/images/video clips with the user of the mobile device 102b via the established communication channel in real-time.

It is noted that the same satellite (e.g. 104a) may communicate with both of the mobile devices (e.g. 102a and 102b) if the two mobile devices are within the range covered by the satellite 104a. In such a case, the satellite 104a may be able to provide a communication channel between the two mobile devices 102a and 102b.

Figure 4:
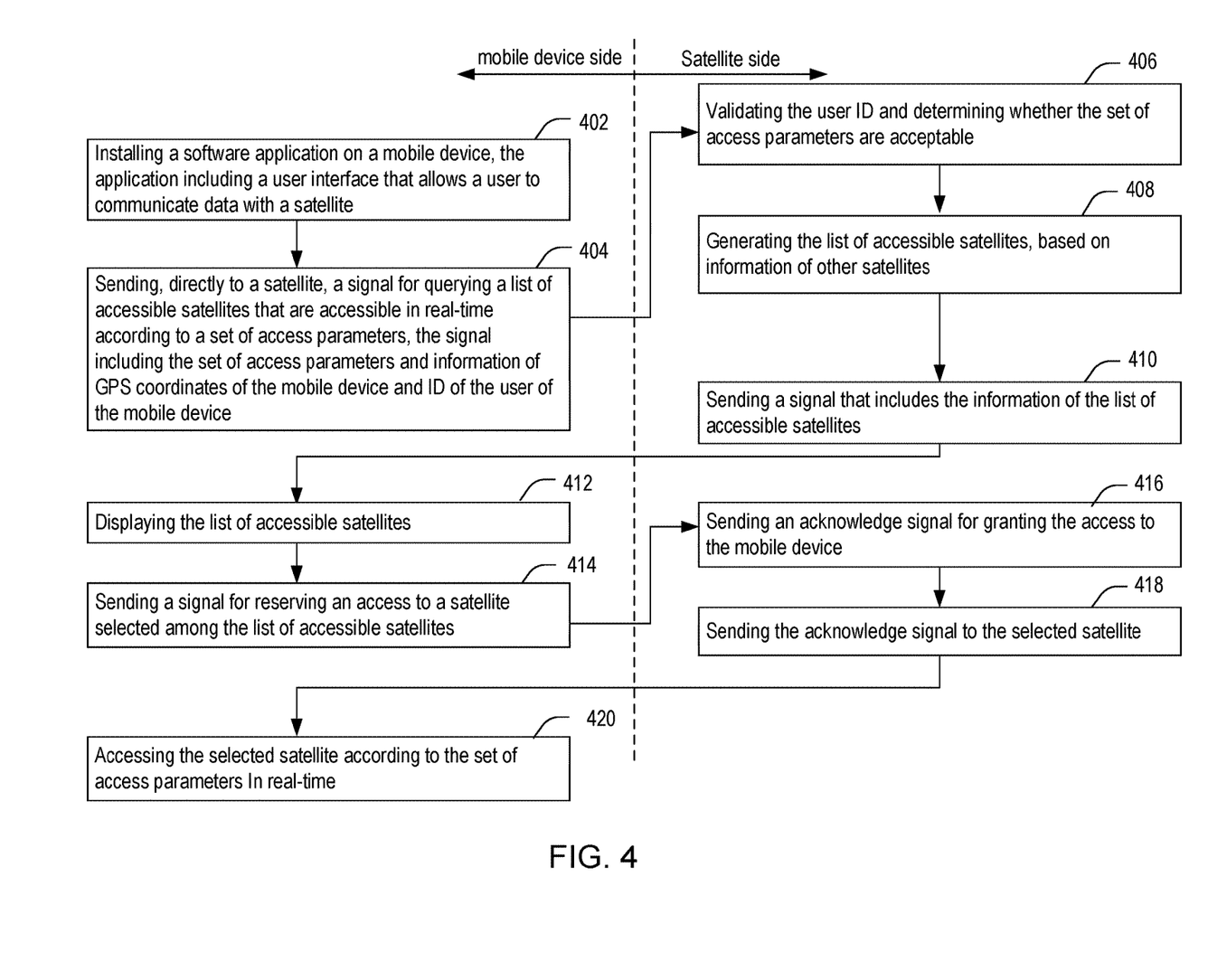
FIG. 4 shows a flowchart of an illustrative process for accessing/controlling a satellite in real-time using a mobile device on the ground according to embodiments of the present disclosure.
Figure 5:
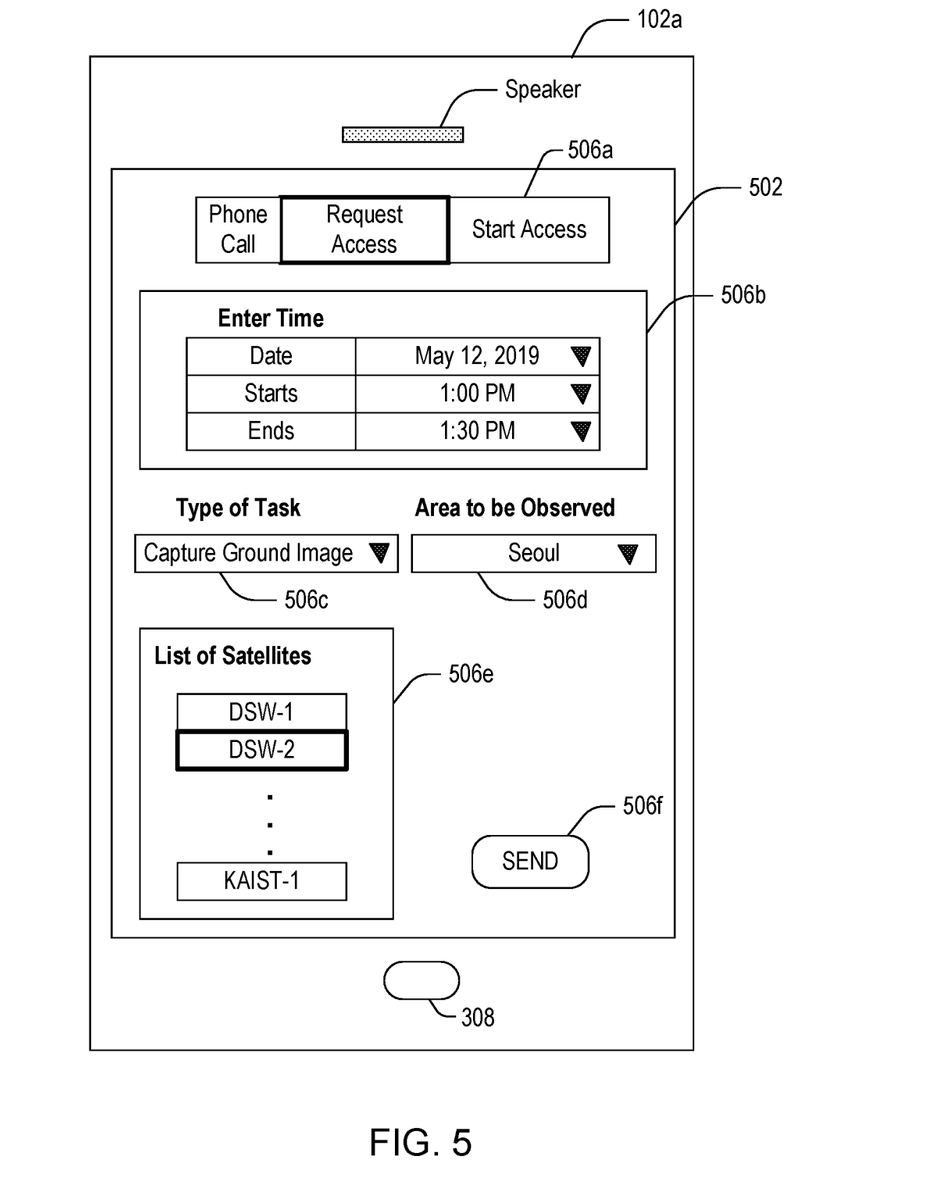
FIG. 5 shows a mobile phone according to embodiments of the present disclosure.

FIG. 4 shows a flowchart of an illustrative process for accessing/controlling a satellite in real-time using a mobile device on the ground according to embodiments of the present disclosure. The process may start at step 402. At step 402, the user of the mobile device (e.g. 102a) may install a software application on the mobile device 102a, where the application displays a graphic user interface (GUI) that allows a user to communicate data with a satellite (e.g. 104a). FIG. 5 shows the mobile phone 102a according to embodiments of the present disclosure. As depicted, the mobile phone 102a may include: a speaker; a button 308; and a display 502 for displaying the GUI components 506a-506e.

In embodiments, the user may touch the "Request Access" button in the menu 506a. Then, in response to the user's touch of the "Request Access" button, the mobile device 102a may display the GUI components 506b-506e on the display 502. Using the GUI components 506b-506d, the user may select access parameters, such as the date and time window 506b during which he wants to access a satellite, the type of task 506c and target location 506d. Then, the user may touch the "SEND" button 506f.

In response to the user's touch of the button 506f, the mobile device 102a may send, directly to the satellite 104a, a signal for querying a list of accessible satellites that are accessible according to the access parameters at step 404. In embodiments, the signal may include the access parameters and the information of the global positioning system (GPS) coordinates of the mobile device 102a and identification (ID) of the user of the mobile device. At step 406, the satellite 104a may validate the user ID using the signal from the mobile device 102a.

Upon successful validation of the user ID, the satellite 104a may determine whether the access parameters are within permitted ranges and acceptable. It may be possible that some of the access parameters may be beyond the limit set by the satellite 104a. For instance, certain areas, such as military base, that the government prohibits an access to for security reasons cannot be observed.

Upon determining that the access parameters are with the permitted ranges, the satellite 104a may generate a list of satellites that can be accessed by the mobile device 104a according to the access parameters at step 408. In embodiments, the satellite 104a may use the information of other satellites in the satellite network 104 and in the satellite constellation 144 to generate the list. In embodiments, the information of other satellites at step 408 may include the information that is required to determine whether the satellites meet the access parameters. By way of example, the information may include flight information, such as current locations of the satellites, areas covered by the satellites, flight schedules and trajectories of the satellites, so on. In another example, the information may include specification of the satellites, such as the communication power, numbers and sizes of antennas, so on.

At step 410, the satellite 104a may send a signal that includes the information of a list of accessible satellites to the mobile device 102a.

At step 412, the mobile device 102a may display the received list of accessible satellites on the GUI component 506e, as shown in FIG. 5. In embodiments, the user may select a satellite (e.g. "DSW-2") by touching one of the satellites in the list on the GUI component 506e, as shown in FIG. 5. Upon selecting a satellite in the list 506e, the user may touch the "SEND" button 506f. Then, at step 414, the mobile device 102a may send a signal for reserving an access to the satellite "DSW-2" that is selected among the list of satellites 506e. In embodiments, the user may select more than one satellite among the list of satellites 506e. In embodiments, the signal for reserving the access may include the access parameters that are selected using the GUI components 506b-506d.

At step 416, the satellite 104a may send an acknowledgement signal for granting the access to the mobile device 102a at step 416. At step 418, the satellite 104a may send the acknowledgement signal to the selected satellite. In embodiments, the acknowledgement signal may be sent to other satellites in the satellite network 104 and satellite constellation 144. In embodiments, the satellite 104a may store the information of the grant to access in its memory.

At step 418, the user of the mobile device 102a may touch the "Start Access" button in the menu 506a to access the selected satellite according to the access parameters 506b-506d. For instance, the mobile device 102a may directly control the satellite 104a during the selected time window to capture images of Seoul. In another example, the mobile device 102a may directly receive data that is provided by the satellite 104a, such as, still image, video clips, etc. and display the data on the display 502.

In embodiments, the satellites 104 may communicate data with the mobile devices 102 based on the block chain technology so that the data is not modified. It is noted that other suitable types of security measures may be used by the satellites 104 to secure the data communicated with the mobile devices 102.

In embodiments, the satellite 104a may assign a higher priority to the mobile device 102a than the mobile device 102b so that the mobile device 102a may access the satellite 104a before the mobile device 140b, even though the mobile device 102a requested the access after the mobile device 102b. For instance, the mobile device 102a may be used to broadcast the natural disaster or national emergency. In embodiments, the satellite 104a may adjust the existing grants to access the satellite 104a according to the priority and notify the adjustment to the corresponding mobile devices.

Figure 6:
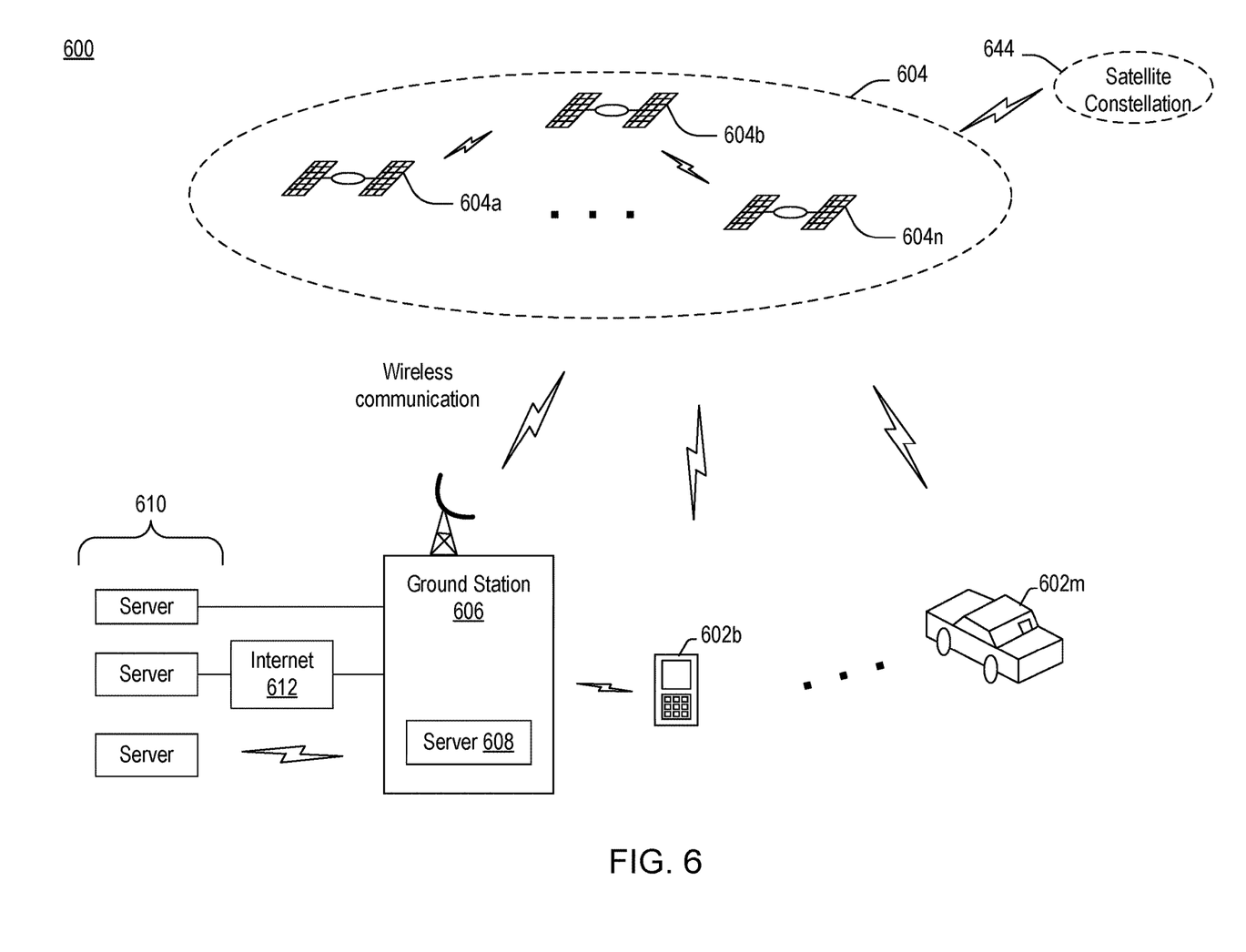
FIG. 6 shows a schematic diagram of a system for direct communication between satellites and mobile devices according to embodiments of the present disclosure.

FIG. 6 shows a schematic diagram of a system 600 for direct communication between satellites and mobile devices according to embodiments of the present disclosure. The system 600 may be similar to the system 100, with the difference that one or more ground stations 606 may communicate with the satellites 604 and satellite constellation 644. It is noted that other suitable number of ground stations may be used in the system 600, even though only one ground station is shown in FIG. 6.

In embodiments, the mobile devices 602a-602m may have the similar functions as the mobile devices 102a-102k to directly communicate with the satellites 604, as described in conjunction with FIGS. 1-5. Similarly, the satellites 604 may have the similar functions as the satellites 104 such that each of the mobile devices 602a-602m may be able to chat and/or exchange messages/images/video clips with other mobile device in real-time and access the satellite during a reserved time window. Similarly, each of the satellite 604 may act as a gateway to the satellite constellation 644 for the mobile devices 602a-602m.

Figure 7:
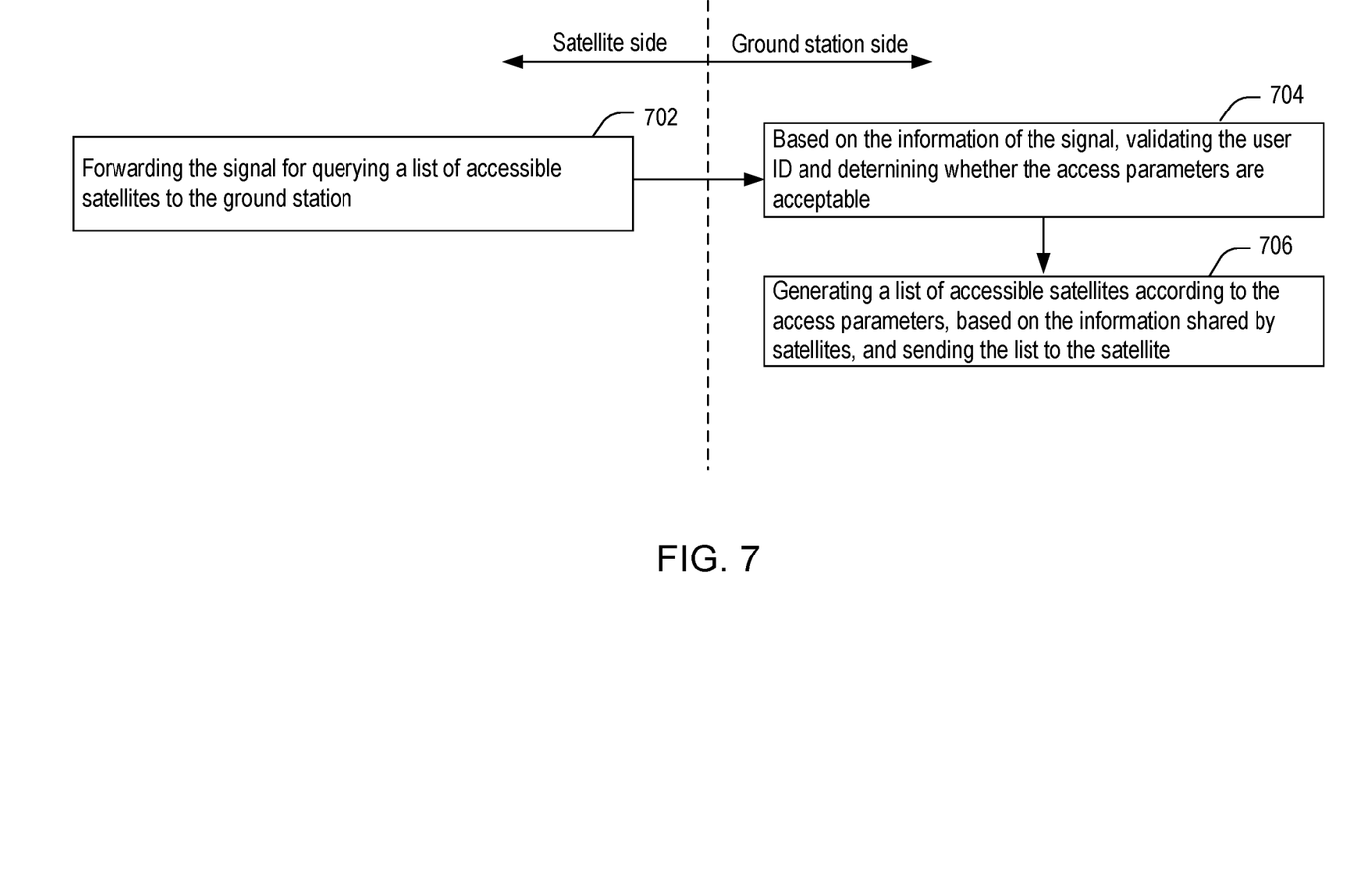
FIG. 7 shows a flowchart of an illustrative process for direct communication between satellites and a ground station according to embodiments of the present disclosure.

In embodiments, the ground station 606 may have a server 608 that shares (and stores) the information with the satellites 604 and is able to perform various tasks on behalf of the satellites 604. FIG. 7 shows a flowchart of an illustrative process for direct communication between satellites 604 and the ground station 606 according to embodiments of the present disclosure. In embodiments, a mobile device (e.g. 602a) may directly communicate data with a satellite (e.g. 604a) in real-time. When the mobile device 602a sends the signal querying an access to a satellite(s) (as described in conjunction with step 404), the satellite may forward the query signal to the ground station 606 at step 702. Then, the ground station 606 may validate the user ID, determine whether the access parameters are acceptable and in permitted ranges, generate the list of accessible satellites, and send the validation result and the list to the satellite 604a at steps 704 and 706, i.e., the ground station 606 may perform the steps 406 and 408 on behalf of the satellite 604a. Then, the satellite 604a may send the information of the list of accessible satellites to the mobile device 602a (as described in conjunction with step 410).

In another example, the satellite 604a may assign a higher priority to the mobile device 602a than the mobile device 602b so that the mobile device 602a may access the satellite 604a before the mobile device 602b, even though the mobile device 602a requested the access after the mobile device 602b. In embodiments, when the mobile device 602a sends a signal for reserving an access to a satellite selected among the list of accessible satellites (as described in conjunction with step 414), the satellite 604a may forward the received signal to the ground station 606, and the ground station may adjust the existing grants to access the satellite 604a according to the priority. Then, the ground station 606 may send the information of the adjusted grants to the satellite 604a so that the satellite 604a may forward the information to the corresponding mobile devices.

In embodiments, the ground station 606 may be communicatively coupled to one or more servers (or computing devices) 610 either wirelessly, by wire or via the Internet 612. In embodiments, one of the severs 610 may be a computing device of an advertisement company and send an advertisement information to the satellites 604 via the ground station 606. Then, the satellites 604 may broadcast the advertisement to the mobile devices 602a-602m. For instance, the advertisement may be a banner displayed on the display of the mobile devices.

In embodiments, the mobile device 602a may not be able to process all of the data received from the satellite 604a at once due to the limited memory size; instead, the data received from the satellite 604a may be saved in the sever 608 of the ground station 606 and the server 608 may break the data into multiple segments and send each segment separately to the mobile device 602a via the satellite 604a in real-time. In alternative embodiments, the satellite 604a may break the data into multiple segments and send each segment directly to the mobile device 602a.

Figure 8:
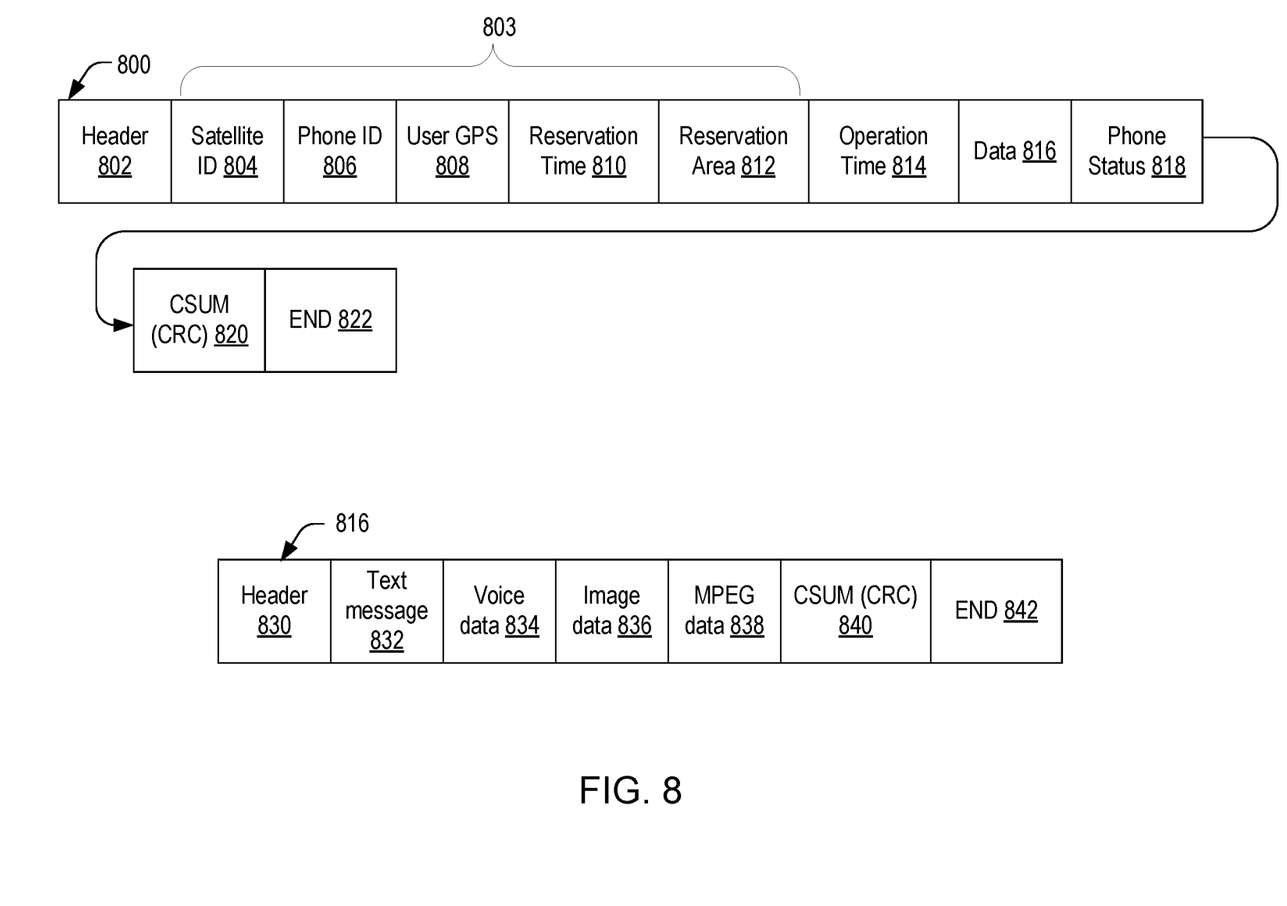
FIG. 8 shows a schematic diagram of an exemplary protocol of data that is transmitted from a mobile device to a satellite according to embodiments of the present disclosure.

In embodiments, the mobile devices 102 and 602 may send data to the satellites 104 and 604 according to various data protocols. FIG. 8 shows a schematic diagram of an exemplary protocol 800 of data that is transmitted from a mobile device to a satellite according to embodiments of the present disclosure. As depicted, the protocol 800 may include: header 802 including the information for parsing the following portion of the data; satellite ID 804 including an identification information of the receiving satellite; phone ID 806 including an identification information of the data sending mobile device 102a; user GPS 808 including a coordinate information of the mobile device 102a; reservation time 810 including the information of the access time in the GUI component 506b; reservation area 812 including the information of target area in the GUI component 506d; operation time 814 including the information of the operation time; data 816; phone status 818 including the status of the mobile device (e.g. 102b) that the user of the mobile device 102a wants to communicate with; CSUM 820 including information for checksum, such as cyclic redundancy check (CRC); and end portion 822 including end portion of the data. In embodiments, telemetry data may refer to the information in the data fields 804, 806, 808, 810 and 812.

In embodiments, the protocol 800 may include the information, such as reservation (or access) time 810 and area 812, that the user of the mobile device (e.g. 102a) enters into the GUI components 306b-306d and 506b-506e and the information, such as phone ID 806 and user GPS 808, that the mobile device 104a adds when the data is sent to the satellite (e.g. 104a). It should be apparent to those of ordinary skill in the art that other types of protocol may be used to send the data 816 in place of the protocol 800. It should be also apparent to those of ordinary skill in the art that some of the data fields in the protocol 800 may not carry any information and that addition data fields may be added to the protocol 800. For instance, the phones status 818 may not include any information since the mobile device 102a may not know about the status of the mobile phone 102b at the time when the mobile device 102a sends a request for communication with the mobile device 102b via the satellite 104a.

In embodiments, the data 816 may include various contents, depending on the type of the communication between the mobile device 102a and satellite 104a. In embodiments, the mobile device 102a may communicate data with another mobile device 102b vi the satellite 104a, as discussed in conjunction with FIGS. 2 and 3. In such a case, the data 816 may include: header 830 including the information for parsing the following portion of the data; text message 832 including text message entered into the GUI component 306c by the user of the mobile device 102a; voice message 834 including voice message of the user of the mobile device 102a; image data 836 uploaded by the user of the mobile device 102a using the GUI component 306d; MPEG data 838 uploaded by the user of the mobile device 102a; CSUM (CRC) 840 including information for checksum; and end 842 including end portion of the data 816.

In embodiments, the mobile device 102a may use the protocol 800 to send data to the satellite 104a at various steps in FIG. 4. In such a case, some of the information fields of the data 816 may not carry any information therein.

In embodiments, the mobile device 102a may want to broadcast an advertisement. In such a case, the data 816 may include an advertisement, such as banner, where the satellite 104a may download the advertisement contents to other mobile devices.

Figure 9:
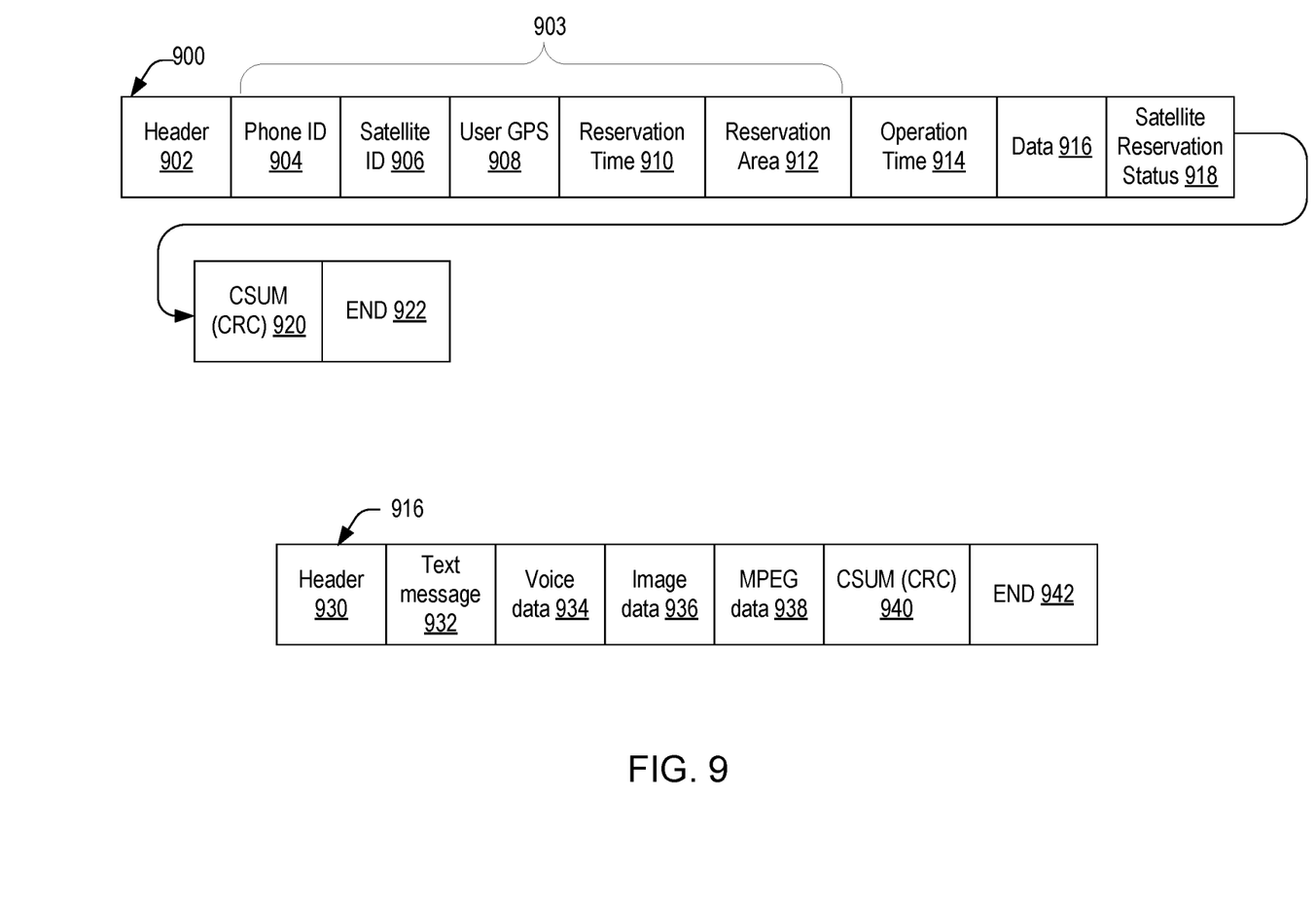
FIG. 9 shows a schematic diagram of an exemplary protocol of data that is transmitted from a satellite to a mobile device according to embodiments of the present disclosure.

In embodiments, the satellites 104 and 604 may send data to the mobile devices 102 and 602 according to various data protocols. FIG. 9 shows a schematic diagram of an exemplary protocol 900 of data that is transmitted from a satellite to a mobile device according to embodiments of the present disclosure. As depicted, the protocol 900 may include: header 902 including the information for parsing the following portion of the data; phone ID 904 including an identification information of the receiving mobile device 102a; satellite ID 906 including an identification information of the data sending satellite 104a; user GPS 908 including a coordinate information of the mobile device 102a; reservation time 910 including the information of the access time; reservation area 912 including the information of target area of interest; operation time 914 including the information of the operation time; data 916; satellite reservation status 918 information on whether the satellite 104a is accessible during the reservation time in the reservation area; CSUM 920 including information for checksum, such as cyclic redundancy check (CRC); and end portion 922 including end portion of the data. In embodiments, telemetry data may refer to the information in the data fields 904, 906, 908, 910 and 912.

In embodiments, the data 916 may include various contents, depending on the type of the communication between the mobile device 102a and satellite 104a. In embodiments, the mobile device 102a may communicate data with another mobile device 102b vi the satellite 104a, as discussed in conjunction with FIGS. 2 and 3. In such a case, the data 916 sent to the mobile device 102a may include: header 930 including the information for parsing the following portion of the data; text message 932 including text message uploaded by the user of the mobile device 102b; voice message 934 including voice message of the user of the mobile device 102b; image data 936 uploaded by the user of the mobile device 102b; MPEG data 938 uploaded by the user of the mobile device 102b; CSUM (CRC) 940 including information for checksum; and end 942 including end portion of the data 916.

In embodiments, the satellite 104a may use the protocol 900 to send data to the mobile device 102a at various steps in FIG. 4. In such a case, some of the information fields of the data 916 may not carry any information therein.

Figure 10:
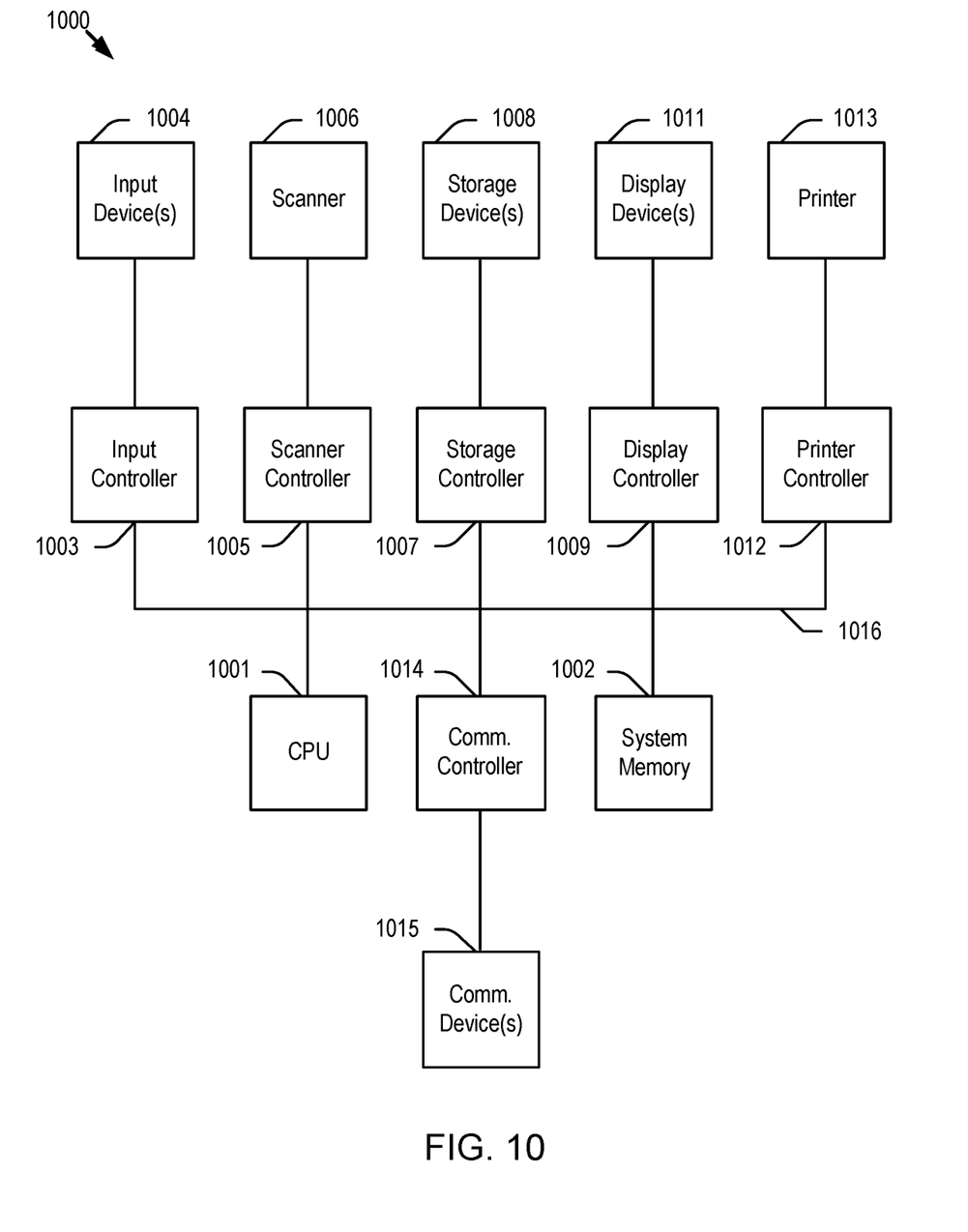
FIG. 10 shows a schematic diagram of a system for implementing one or more aspects of the present disclosure.

FIG. 10 shows a schematic diagram of a system 1000 for implementing one or more aspects of the present disclosure. It will be understood that the functionalities shown for system 1000 may operate to support various embodiments of the electronic devices (such as mobile devices, servers and satellites) shown in FIGS. 1-9—although it shall be understood that an electronic device may be differently configured and include different components. As illustrated in FIG. 10, system 1000 includes a central processing unit (CPU) 1001 that provides computing resources and controls the computer. CPU 1001 may be implemented with a microprocessor or the like, and may also include a graphics processor and/or a floating point coprocessor for mathematical computations. System 1000 may also include a system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. System 1000 may also include a display controller 1009 for providing an interface to a display device 1011, which may be a cathode ray tube (CRT), a thin film transistor (TFT) display, or other type of display. System 1000 may also include a printer controller 1012 for communicating with a printer 1013. A communications controller 1014 may interface with one or more communication devices 1015, which enables system 1000 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

What is claimed is:

1. A mobile device for directly communicating with one or more satellites, comprising:
    a communication device for directly communicating data with a satellite;
    a display for displaying a graphic user interface (GUI);
    one or more processors; and
    a non-transitory computer-readable medium comprising one or more sequences of instructions which, when executed by the one or more processors, causes steps to be performed comprising:
        responsive to a touch on the GUI, sending data directly to the satellite via the communication device,
    wherein the data includes a set of access parameters, a query for a list of satellites that are accessible in real-time according to the set of access parameters, global positioning system (GPS) coordinates of the mobile device and an identification of a user of the mobile device.

2. A mobile device as recited in claim 1, wherein the GUI displays a list of phone numbers and wherein the data sent to the satellite includes a request for establishing a communication channel in real-time via the satellite to an other party that corresponds to one phone number in the list of the phone numbers.

3. A mobile device as recited in claim 2, wherein the data sent to the satellite includes information of global positioning system (GPS) coordinates of the mobile device and an identification of a user of the mobile device.

4. A mobile device as recited in claim 1, where the steps further comprise:
    receiving an information of the list of accessible satellites from the satellite;
    displaying the list of accessible satellites on the display; and
    responsive to a user's selecting one accessible satellite among the list of accessible satellites, sending, to the satellite, a signal for reserving an access to the selected satellite.

5. A mobile device as recited in claim 4, where the steps further comprises:
    accessing the selected satellite according to the set of access parameters in real-time.

6. A mobile device as recited in claim 1, wherein the mobile device may be at least one of mobile phone, palm computer, tablet personal computer, notebook computer, AR (Augmented Reality) device, VR (Virtual Reality) device, smart wearable, and remote controlling device.

7. A satellite for directly communicating with one or more mobile devices on a ground, comprising:
    a communication device for directly communicating data with a mobile device;
    one or more processors; and
    a non-transitory computer-readable medium comprising one or more sequences of instructions which, when executed by the one or more processors, causes steps to be performed comprising:
        receiving data directly from the mobile device via the communication device,
    wherein the data received from the mobile device includes a set of access parameters, a query for a list of satellites that are accessible in real-time according to the set of access parameters, global positioning system (GPS) coordinates of the mobile device and an identification (ID) of a user of the mobile device.

8. A satellite as recited in claim 7, wherein the data received from the mobile device includes a request for establishing a communication channel for communication between the mobile device and an other party via the satellite in real-time.

9. A satellite as recited in claim 8, wherein the data received from the mobile device includes information of global positioning system (GPS) coordinates of the mobile device and an identification (ID) of a user of the mobile device.

10. A satellite as recited in claim 9, wherein the steps further comprise:
   validating the ID of the user;
   determining a feasibility of establishing the communication channel; and
   responsive to a positive determination of the feasibility, establishing the communication channel through which the mobile device communicates with the other party in real-time.

11. A satellite as recited in claim 7, wherein the step further comprises:
   validating the ID of the user;
   determining whether the set of access parameters are acceptable;
   generating the list of accessible satellites based on information of other satellites; and
   sending a signal that includes information of the list of accessible satellites to the mobile device.

12. A satellite as recited in claim 11, wherein the step further comprises:
   receiving a signal for reserving an access to a satellite selected among the list of accessible satellites from the mobile device; and
   sending an acknowledgement signal for granting the access to the satellite to the mobile device.

13. A method for accessing a satellite using a mobile device on a ground, comprising:
   sending data to a satellite, the data including a set of access parameters, a query for a list of satellites that are accessible in real-time according to the set of access parameters, global positioning system (GPS) coordinates of the mobile device and an identification of a user of the mobile device;
   receiving information of the list of satellites;
   displaying the list of satellite on a GUI; and
   responsive to a user's selection of a satellite among the list of satellites, sending, to the satellite, a signal for reserving an access to the selected satellite.

14. A method as recited in claim 13, further comprising:
   receiving an acknowledgement signal for granting the access to the selected satellite from the satellite; and
   accessing the selected satellite in real-time according to the set of access parameters.

15. A method for accessing a satellite using a mobile device on a ground, comprising:
   receiving data from a mobile device on a ground, the data including a set of access parameters, a query for a list of satellites that are accessible in real-time according to the set of access parameters, global positioning system (GPS) coordinates of the mobile device and an identification (ID) of a user of the mobile device;
   validating the ID of the user;
   determining whether the set of access parameters are acceptable;
   generating the list of accessible satellites based on information of other satellites; and
   sending a signal that includes information of the list of accessible satellites to the mobile device.

16. A method as recited in claim 15, further comprising:
   receiving a signal for reserving an access to a satellite selected among the list of accessible satellites from the mobile device; and
   sending an acknowledgement signal for granting the access to the mobile device.

17. A method as recited in claim 15, further comprising:
   sending the acknowledgement signal to the selected satellite.

* * * * *